April 10, 1962  G. V. ANDERSON  3,028,879
SELF-ACTUATING VALVE
Filed Nov. 24, 1958  2 Sheets-Sheet 1
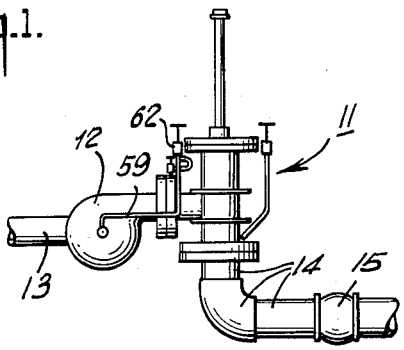
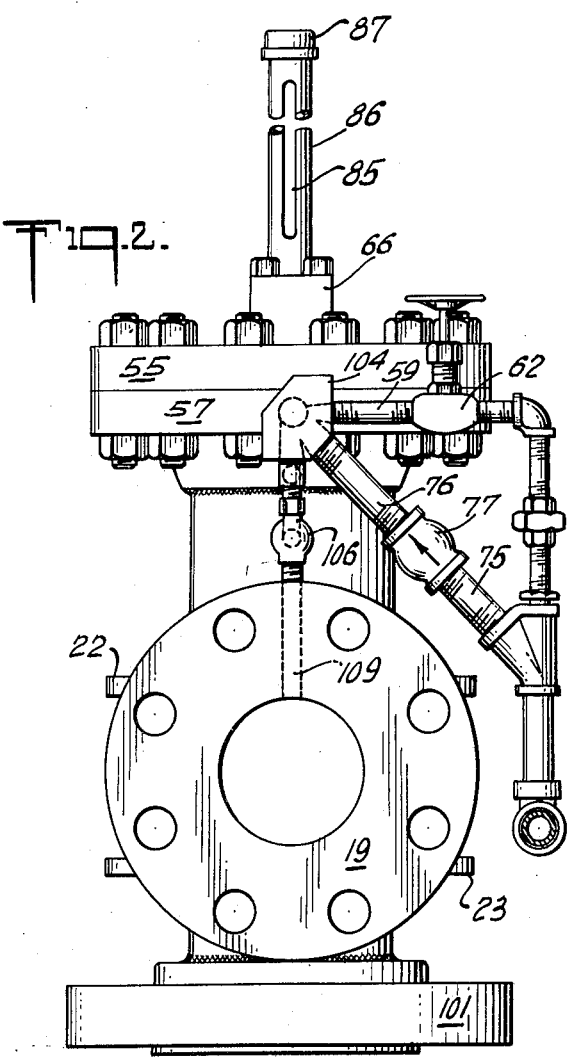

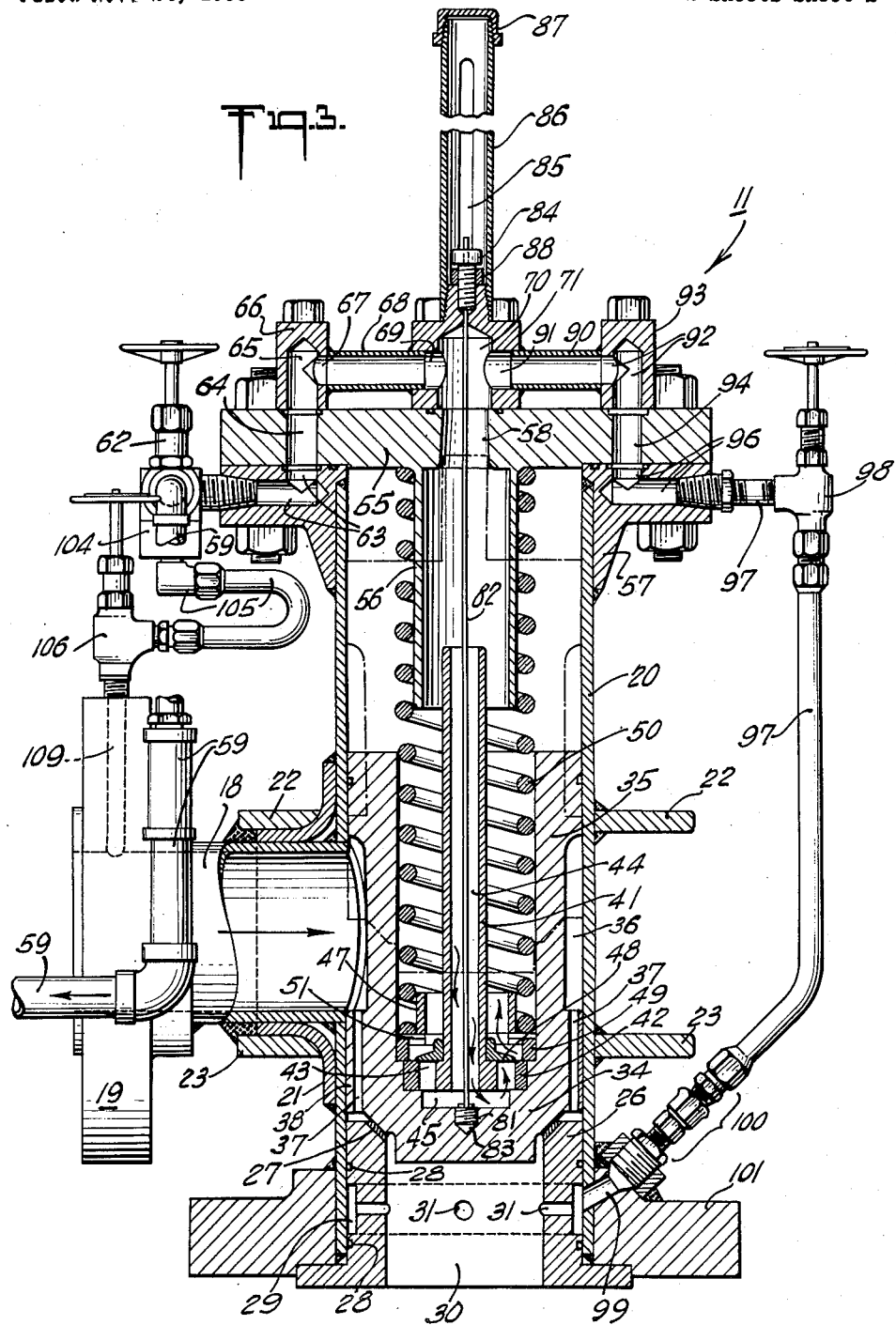

United States Patent Office 3,028,879
Patented Apr. 10, 1962

3,028,879
SELF-ACTUATING VALVE
Gran V. Anderson, Houston, Tex., assignor to The Texas Pipe Line Company, Houston, Tex., a corporation of Texas
Filed Nov. 24, 1958, Ser. No. 775,905
6 Claims. (Cl. 137—556)

This invention is concerned with a valve. More specifically it is concerned with a self actuating valve that is hydraulic in nature, and that is particularly adaptable for use with a pump whereby the valve automatically connects the output fluid from the pump for delivery to a pipe line or the like.

In pipe line service involving pumps such as centrifugal pumps that are driven by electric motors, there is a problem involved in the starting up of such a pump and connecting same into the line. Heretofore, this operation has involved the manually controlled operation of starting the motor with the valve closed or nearly closed, immediately followed by opening the valve to the full open position. Sometimes this operation was carried out automatically, with the use of some type of valve operator to open the valve, shortly after or with the energization of the motor. However, the manual operation is costly due to the use of a human operator; and it is an arduous task for the size valves that are being contemplated here. On the other hand, the automatic valve operator entails additional equipment which must have a separate power source to actuate it. Also such extra equipment means more maintenance problems.

Consequently, it is an object of this invention to provide a hydraulically self actuating valve that supplies the force necessary for its own operation by means of the fluid that is being pumped.

Another object of this invention is to provide for a hydraulic self actuating valve that is adapted for use with a pump of hydraulic fluid, such that the hydraulic fluid output from the pump will cause the opening of the valve without any attention, but with a desired degree of timing to allow the proper connection of the pump to the pipe line load.

It is another object of this invention to provide a self-actuating hydraulic valve that is adapted for use with a pipe line pump, in such a manner that the valve may be automatically operated upon the build up of hydraulic pressure at the outlet of the pump. Furthermore, this valve is provided with an arrangement for causing the valve to stop at a predetermined partially open state if desired, in order to act as a throttling valve.

Briefly, the invention may be described as the combination, with a pump for hydraulic fluid, of a self-actuating valve for automatically connecting and disconnecting said pump from the line as the pump is started up and stopped. This combination comprises a piston actuated valve plug that is situated for longitudinal movement into and out of engagement with a valve seat. The combination also comprises a cylinder for said piston, said cylinder being so situated that one end of said piston is in hydraulic communication with the output side of said pump. The combination also comprises means for connecting the cylinder on the other end of said piston to the input side of said pump, said piston having no passage for fluid flow therethrough from one end to the other.

Again briefly, the invention may be described as a self-acutating valve for automatically connecting and disconnecting a source of fluid under pressure to a fluid line for movement of said fluid. The said valve comprises a piston actuated valve plug that is situated for longitudinal movement into and out of engagement with a valve seat. The valve also comprises a cylinder for said piston, said cylinder being so situated that one end of said piston is in fluid communication with said source of fluid. It also comprises means for connecting the cylinder on the other end of said piston, to the input side of said source. The said piston has no passage for fluid-flow through from one end to the other thereof. The combination also comprises means for biasing said plug into valve closing contact with said seat.

The foregoing and other objects and benefits of the invention will be more fully understood in connection with a particular embodiment that is described in greater detail below, and that is illustrated in the drawings, in which:

FIG. 1 is a side elevation showing a valve in accordance with the invention, connected to a centrifugal pump and having the outlet side of the valve connected to a pipe that leads to the load;

FIG. 2 is an enlarged end elevation of the valve structure; and

FIG. 3 is a further enlarged longitudinal cross-section view, illustrating the internal elements of the valve.

Referring to FIG. 1 it will be observed that there is shown a valve 11, in accordance with this invention, that is connected to the output side of a centrifugal pump 12. Pump 12 may be driven by any appropriate power source such as an electric motor (not shown). Pump 12 has connected to the input thereof a pipe 13 that delivers the fluid to be pumped.

The output side of the valve 11 is connected to piping 14, illustrated, that leads to the pipe line (not shown) or other load for the fluid being pumped. Normally, there is included in this connection to the line, a check valve 15 for preventing backflow in the case where the line is maintained under pressure.

Referring to FIG. 3, the details of the valve structure of valve 11 will be described. Beginning with the inlet structure thereof, there is an inlet pipe 18 that has a coupling flange 19 welded thereto for coupling the valve to the output of the centrifugal pump 12.

The inlet pipe 18 is connected transversely into a cylindrical body 20 of the valve. This pipe 18 is held in place relative to the body 20 by means of welding, as illustrated, and in addition has a saddle 21 that fits over the end of the pipe 18, and is welded to the outside of the body 20, as illustrated. In addition there are a pair of flat reinforcing rings 22 and 23 that surround the body 20 and also fit over the saddle 21 just above and below the pipe 18.

The valve 11 is adapted for use in a vertical position, as shown in the various figures, and there is an annular valve seat 26 that is formed as an insert into the lower end of the cylindrical body 20 of the valve. This insert includes as elements thereof, a seat ring 27 that may be constructed of any appropriate resilient material. Also, seals 28 are located on either side of an annular passageway 29 that is formed of a groove in the insert 26. Passageway 29 is connected into a central opening or outlet passage 30 of the valve 11 by a plurality of radial holes 31 as illustrated.

For providing the main valving action in cooperation with valve seat 26, there is a valve plug 34 that is integrally part of a piston actuator 35. Piston 35 has a centrally located undercut section 36 located straddling the inlet pipe 18 when the valve is closed. In addition, there are a plurality of longitudinally located holes 37 that extend generally parallel to the axis of the piston 35 through a lower skirt portion 38 thereof which extends below the undercut 36. Holes 37 provide fluid communication with an additionally undercut area of the piston that is formed at the lower tapered surface thereof just above where the plug 34 makes contact with the seat ring 27 of the valve seat.

Piston 35 is hollow at the central portion thereof to make a cup like structure. Located axially therein, there is a relatively long sleeve 41 which has at the base a flange 42 integral therewith. There are a plurality of holes 43 extending through the flange 42 to allow passage of fluid from a hollow passageway 44 inside of the sleeve 41, to the hollow interior of the piston 35. This fluid path is completed via a space 45 at the bottom of the hollow interior of piston 35 and a check valve at the top of holes 43.

The check valve is formed by a ring 48 that surrounds the lower end of the sleeve 41, and that has a flat bottom surface wide enough to extend over the holes 43 for closing same against downward flow of fluid through these holes. The ring 48 is free to move slideably upward about the sleeve 41 for a limited distance. Thus, the ring 48 acts as a flapper that is held in position against movement too far up along the sleeve 41 by means of a two-diameter ring 49 that is tightly fitted within the hollow central portion of cylinder 35, and that has an upstanding reduced diameter sleeve portion 47 for acting as a guide and support for one end of a bias spring 50. The ring 49 has openings or passageways 51 in the form of radial slots that act to provide additional passages for fluid flow upward via the holes 43 and past the flapper ring 48 of the check valve.

At the upper end of the spring 50, it rests against the under side of a disc like top 55 which has an integral downwardly extending sleeve 56 that is surrounded by the spring 50. Top 55 is held in place by being bolted to a neck flange 57 that is welded to the cylindrical body 20 near the top edge thereof.

Coaxially located with the cylindrical body 20, and also the sleeve 56, there is a passage, or hole 58 that passes through the top 55. The dimensions of the hole 58 are made such, relative to the outside diameter of the sleeve 41, that there is only a small clearance space between the outside of sleeve 41 and the sides of the hole 58 when the sleeve 41 rises high enough to enter the hole 58. This provides a throttling action which will be more fully described below in connection with the operation.

A passageway for flow of fluid that passes through the hole 58 is created in order to carry the fluid flowing through hole 58 back to the low pressure, or suction, side of the pump 12, (see FIG. 1). This fluid passage includes external piping 59 that leads from the suction side of the centrifugal pump 12 to a needle valve 62. From the other side of the needle valve 62 the passageway continues via a pair of intersecting drilled holes 63 in the neck flange 57, and then to a hole 64 through the top 55. Hole 64 has appropriate seals, as illustrated, at either end thereof. From the other end of the hole 64, the passageway continues via a drilled hole 65 in a lug 66 that is bolted onto the top 55 over the hole 64. Lug 66 also has a connecting hole 67 drilled into intersection with the hole 65 through the side of the lug 66; and there is a pipe 68 welded into direct connection with the hole 67. Pipe 68 continues the passageway for fluid over to a drilled hole 69 that intersects with a vertical larger diameter drilled hole 70 in a central lug member 71. Member 71 is bolted onto the top 55 in a location so as to axially align the hole 70 with the hole 58 in the top. Here again there are appropriate seals, as illustrated, between the upper surface of the top 55 and the underneath surface of the lug 71.

Referring to FIG. 2 it will be noted that there is an alternative external flow path for fluid, from the suction side of the centrifugal pump 12 to the passageway connected to hole 58 in the top 55 of the main valve. This path may be traced via pipes 75 and 76, as well as a check valve 77. This bypass piping is to provide for the closing of the main valve irrespective of the condition of needle valve 62.

There is an indicator to show the position of the plug 34 and cylinder 35 at all times. Such indicator consists of a small diameter rod 82 that is secured to the plug 34 by a threaded enlargement 81 at the foot of the rod 82. Enlargement 81 is screwed into a supporting socket that consists of a tapped hole 83 at the center of the bottom of the space within the hollow central portion of cylinder 35. The rod 81 extends upward through the top of the central lug 71, and is sealed against fluid leakage where it passes therethrough in a standard manner as by means of a hollow threaded bolt 84 which is screwed down onto some packing (not shown) e.g. a fiber washer and an O ring to provide a seal with respect to the rod 82. The pressure on the packing is maintained by a lock nut 88. The exposed tip of the rod 82 may be viewed, to indicate the position of the plug and cylinder, by means of a pair of slots 85 that are longitudinally situated through the side walls of a guard pipe 86. Pipe 86 has a solid cap 87 screwed on at the top thereof to help keep out foreign matter.

There is another fluid passage for use under special circumstances. It connects in common with the passage described above that terminated with hole 58 through the top 55. This passage connects holes 58 and 70 with the outlet passage 30 by an external path. This external path includes a pipe 90 that is welded to the central lug 71 where it fits into a drilled hole 91 that intersects the hole 70 in the lug 71, on the opposite side from the hole 69. The path then continues via intersecting drilled holes 92 in another lug 93 that is bolted onto the top 55 in the same manner as was the lug 66. There is another hole 94, through the top 55, that connects with a pair of intersecting drilled holes 96 which are in the neck flange 57 diametrically opposite the holes 63. From this point, the path continues via piping 97 that includes therewith a needle valve 98. Finally, the path reaches the annular passageway 29 and the holes 31 via a hole 99 that connects with a set of pipe connection fixtures 100. The connection fixtures 100 are attached to, and the hole 99 is drilled through a base flange 101 that is welded to the base of the body 20.

There is one additional flow path for fluid from the top hole 58 of the main valve. This path branches off after the drilled holes 63 (considering the first described path and going away from the body 20 of the main valve). The branching takes place at a distributor block 104. Block 104 has internal passages for connecting the drilled holes 63 with all three respectively, of the piping 59, the pipe 76, and a third branch of external piping 105. The third branch has included therein another needle valve 106. The piping 105 below the needle valve 106, connects to a radial passage 109 that passes through the flange 19. This path thus connects into the inlet pipe 18 where fluid is received under pressure at the output side of the centrifugal pump 12.

*Operation*

The operation is as follows, in connection with the starting up of the pump 12. Assuming that the internal spaces of the main valve 11 are first filled with fluid. The needle valves 98 and 106 will be closed, while needle valve 62 will be open. Then as the pump 12 is started up, pressure will be built up at the output thereof and in the inlet pipe 18 of the main valve 11. At the same time the pressure will be reduced on the fluid within cylinder 20, above the piston 35, by reason of the connection back via piping 59 to the suction side of the pump 12.

These conditions will therefore cause a force upward on the piston 35, by reason of the effective area on the lower side of the piston that is created by the fluid pressure on undercut section 36 thereof with some additional area provided at the tapered surface of the plug 34, just above the valve seat ring 27. As soon as the pressure differential builds up sufficiently so that the upward forces are greater than the downward forces of the bias spring 50 and the pressure of the fluid existing in the cylinder 20 above the piston 35, the piston 35 will travel upward in the cylinder 20 and carry with it the plug 34 which thus causes the main valve to be opened.

As the piston 35 approaches the top of its travel, the sleeve 41 that extends above the top of the piston 35 will enter the hole 58 in the top 55 of the main valve. These parts are shown in this condition in dashed lines in FIG. 3. Now at this time, by reason of the check valve 48, the only path for flow of the fluid from within the cylinder 20 above the piston 35 (out through the flow path back to suction side of the pump 12) is through the hole 58 on the outside of, or surrounding the sleeve 41. Consequently as soon as the sleeve 41 enters the hole 58 there is a throttling action which causes a cushioning of the movement of piston 35 and avoids any damaging high speed stoppage thereof against the top.

The main valve 11 will remain thus fully open, so long as the pump 12 is operating, and when the pump is shut down the valve will automatically reclose as the pressure falls, when the pump slows down. When the piston 35 and plug 34 first begin to move downward in the closing operation, the return flow of fluid from the suction side of the pump 12 (and via the hole 58 in the top 55 of the main valve) is provided with a relatively free-flow-path. This path may be traced via the center space within the sleeve 41 and through the space 45, the holes 43 and past the check valve flapper ring 48. Then the path continues via both the slots 51 and the central opening space within the two-diameter ring 49, back to the central hollow space within piston 35 and thence into the open space within cylinder 20. Of course, as soon as the piston 35 and sleeve 41, have moved down far enough to bring the top of the sleeve 41 out from within the hole 58, the return flow of fluid need no longer pass through the above described path, and the check valve no longer is of any effect.

Although the closing of the valve would take place by means of the weight of the cylinder 35 and plug 34 without any additional help, it has been found better in practice to provide the spring 50 as an additional force to ensure a good closing action of the valve.

In case the main line check valve 15 (FIG. 1) should be leaking, or for some other reason there should be pressure remaining in the outlet passage 30 when the pump 12 has been shut down; the needle valve 98 may be opened to allow fluid under pressure in the outlet passage 30 to flow back to the space above the cylinder 35 and cause a positive closing of the valve.

In some instances it is desirable to use the main valve 11 as a throttle valve so that it remains in a partially open position only. This may be carried out by making use of the needle valve 62, and if necessary the needle valve 106 also. Thus, the position of the cylinder 35 and plug 34 may be arrested during the opening movements thereof, at any point, by merely closing the needle valve 62 (with needle valve 98 and 106 already closed). This is because such closing of needle valve 62 will arrest the return flow of fluid from above the cylinder 35 back to the suction side of pump 12, and consequently will stop the opening movement of the cylinder and plug. Under these conditions the main valve 11 will still shut down automatically, when the pump 12 is deenergized, because of the external bypass path for flow of fluid via the check valve 77.

Valve 106 and its flow path (described above) is for use in adjusting the throttling position of the main valve plug 34, under operating conditions of the pump 12. Thus, if it is desired to close down the valve 11 while the pump 12 is operating, it is merely necessary to open the needle valve 106 (while valve 62 is closed) and it will cause fluid to flow up into the space above the piston 35 within cylinder 20, forcing the piston 35 and plug 34 to be moved downward toward the closing position.

While a particular embodiment of the invention has been described in considerable detail above in accordance with the applicable statutes, this is not to be taken as in any way limiting the invention but merely as being descriptive thereof.

What is claimed as the invention is:

1. A self actuating valve for automatically connecting and disconnecting a source of fluid under pressure to a fluid line for movement of said fluid, comprising a piston actuated valve plug situated for longitudinal movement into and out of engagement with a valve seat, a cylinder for said piston, said cylinder being so situated that one end of said piston is in fluid communication with said source, a passage for connecting the cylinder on the other end of said piston to the input side of said source, throttling means carried by said piston including a sleeve situated relative to said passage and extending therein for restricting the flow of fluid to said source in order to cushion the movement of said piston at the limit of travel thereof, and a fluid passage connecting the inside of said sleeve with said other end of the piston, said piston having no passage for fluid flow therethrough from one end to the other, and means for biasing said plug into valve closing contact with said seat.

2. A self actuating valve for automatically connecting and disconnecting a source of fluid under pressure to a fluid line for movement of said fluid, comprising a piston actuated valve plug situated for longitudinal movement into and out of engagement with a valve seat, a cylinder for said piston, said cylinder being so situated that one end of said piston is in fluid communication with said source, means for connecting the cylinder on the other end of said piston to the input side of said source, throttling means carried by said piston including a sleeve situated relative to said connecting means for restricting the flow of fluid to said source in order to cushion the movement of said piston at the limit of travel thereof, a fluid passage connecting the inside of said sleeve with said other end of the piston, and a check valve in said fluid passage to permit unrestricted flow of fluid past said throttling means in the reverse direction, to allow free movement of the piston in a valve closing direction, said piston having no passage for fluid flow therethrough from one end the other, and means for biasing said plug into valve closing contact with said seat.

3. The invention according to claim 2 additionally including indicator means attached to said piston for movement therewith and extending outside of said self actuating valve for positively indicating the position of said valve at all times.

4. A self actuating valve for automatically connecting and disconnecting a source of fluid under pressure to a fluid line for movement of said fluid, comprising a cylindrical body adapted for mounting in a substantially vertical position and having an annular valve seat within said body near the lower end thereof, an inlet passage extending transversely from said cylindrical body and located above said seat, an outlet passage formed by the lower open end of said cylindrical body and coaxial with said annular seat, a piston adapted for longitudinal movement within said cylindrical body and including an integral plug structure for providing valve action in cooperation with said seat, said piston having seal means relative to said cylindrical body, said seal means being located above said inlet passage at all times, said piston also having undercut structure for providing annular fluid space to cause valve opening force on said piston when the pressure at the inlet is sufficient relative to opposite forces on said piston, a top closing member for said cylindrical body and having a fluid passage therethrough for connecting the space above said piston with the input side of said source, a sleeve carried by and extending above the top of said piston, said sleeve being located coaxially with said fluid passage and having outside dimensions only slightly less than the corresponding inside dimensions of said fluid passage, a passage through the center of said sleeve and connected to the space above said piston, a check valve in said last named passage to permit flow of fluid through the center of said sleeve in a direction toward said space above the piston only, and a spring between said top member and said piston for urging said valve plug against the seat, said integral piston and plug being impervious to passage of fluid in either direction from below said seal means to said space above the piston.

5. The invention according to claim 4 further including a valve in series with said fluid passage through said top, in order to arrest the opening of said self actuating valve at any intermediate position.

6. The invention according to claim 5 further including an indicator rod attached to said piston and located centrally relative to said sleeve and said fluid passage and extending outside of said top to indicate the position of the piston and plug at all times.

References Cited in the file of this patent

UNITED STATES PATENTS

| | | |
|---|---|---|
| 751,096 | Nethery | Feb. 2, 1904 |
| 1,477,329 | Edell | Dec. 11, 1923 |
| 1,540,214 | Hudson | June 2, 1925 |
| 1,571,396 | Darrow | Feb. 2, 1926 |
| 2,880,959 | Falconer | Apr. 7, 1959 |

FOREIGN PATENTS

| | | |
|---|---|---|
| 553,120 | Germany | June 24, 1932 |